United States Patent
Choudhary et al.

(10) Patent No.: US 12,541,395 B2
(45) Date of Patent: Feb. 3, 2026

(54) DYNAMIC JOB DEPENDENCY DISCOVERY AND CONSTRAINTS GENERATION TO SCHEDULE EDA WORKLOADS IN CLOUD ENVIRONMENTS

(71) Applicant: Synopsys, Inc., Sunnyvale, CA (US)

(72) Inventors: Parivesh Choudhary, Sunnyvale, CA (US); Ganapathy Parthasarathy, Fremont, CA (US); Saurav Nanda, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 125 days.

(21) Appl. No.: 18/226,674

(22) Filed: Jul. 26, 2023

(65) Prior Publication Data

US 2025/0036461 A1    Jan. 30, 2025

(51) Int. Cl.
*G06F 30/20* (2020.01)
*G06F 9/48* (2006.01)
*G06F 9/54* (2006.01)

(52) U.S. Cl.
CPC .............. *G06F 9/4881* (2013.01); *G06F 9/54* (2013.01)

(58) Field of Classification Search
CPC ................................. G06F 9/4881; G06F 9/54
See application file for complete search history.

(56) References Cited

U.S. PATENT DOCUMENTS

| | | | | |
|---|---|---|---|---|
| 8,959,370 B2 * | 2/2015 | Zomaya | ................ | G06F 9/5038 713/323 |
| 8,997,109 B2 * | 3/2015 | Lee | ....................... | G06F 9/5038 718/107 |
| 9,081,928 B2 * | 7/2015 | Van Eijndhoven | ..... | G06F 8/456 |
| 9,183,058 B2 * | 11/2015 | Li | .......................... | G06F 9/5066 |
| 10,733,019 B2 * | 8/2020 | Cao | ........................ | G06F 9/5044 |
| 10,866,832 B2 * | 12/2020 | Ohba | ..................... | G06F 9/4881 |
| 11,023,285 B2 * | 6/2021 | Jin | .......................... | G06F 9/505 |
| 11,190,618 B2 * | 11/2021 | Xu | .......................... | G06F 17/00 |
| 11,392,415 B2 * | 7/2022 | Pathak | .................. | G06F 9/4881 |
| 2012/0158816 A1 * | 6/2012 | Choi | ..................... | G06F 9/4881 709/201 |
| 2015/0199214 A1 * | 7/2015 | Lee | ......................... | G06F 9/505 718/102 |
| 2022/0405129 A1 * | 12/2022 | Zhang | .................. | G06F 9/4881 |
| 2024/0004706 A1 * | 1/2024 | Wang | .................... | G06F 9/4893 |
| 2024/0039808 A1 * | 2/2024 | Singwi | ................ | G06F 9/45558 |
| 2024/0103907 A1 * | 3/2024 | Zhang | .................. | G06F 9/5072 |

FOREIGN PATENT DOCUMENTS

WO    WO-2006068943 A2 *    6/2006    ........... G06F 9/4887

OTHER PUBLICATIONS

Synopsis, Heterogeneous Cluster & Dynamic Scaling Features on Synopsys Cloud, Apr. 2023, pp. 1-3 (Year: 2023).*

* cited by examiner

*Primary Examiner* — Cheng Yuan Tseng
(74) *Attorney, Agent, or Firm* — Patterson + Sheridan, LLP

(57) ABSTRACT

Systems and methods to receive a computing job from an Electronic Design Automation (EDA) software application, and dynamically determine at least one precedence or successor job constraint for the received computing job, are described herein. Further, an edge inference algorithm is used to determine edges of a Dynamic Acyclic Graph (DAG) representing the EDA software application computing jobs, along with jobs that are dependent on the received computing job. In this way, job dependencies are discovered and scheduled dynamically, reducing turnaround time, and increasing efficiency of computing resources.

20 Claims, 7 Drawing Sheets

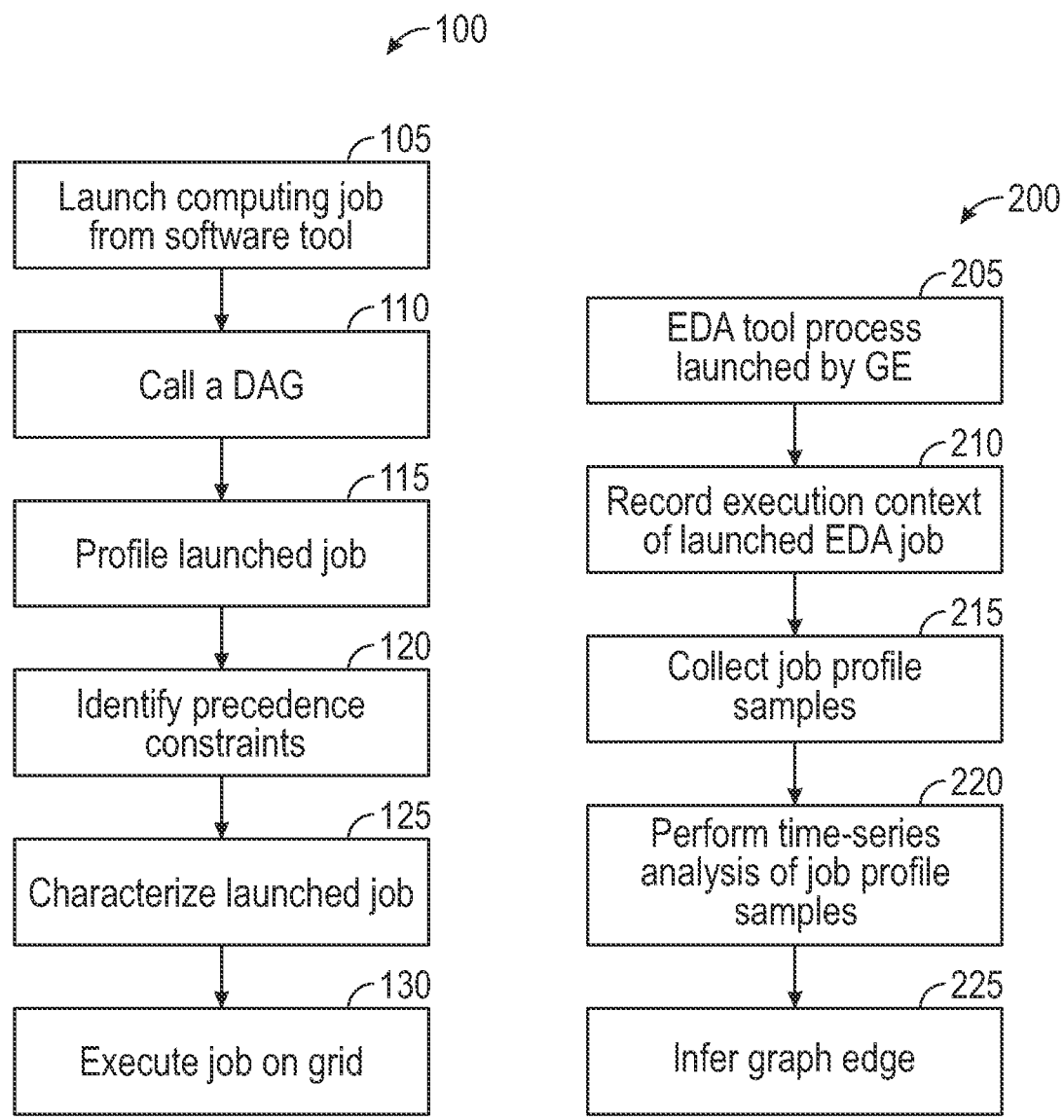

DYNAMIC JOB DEPENDENCY DISCOVERY AND CONSTRAINTS GENERATION TO SCHEDULE EDA WORKLOADS IN CLOUD ENVIRONMENTS

TECHNICAL FIELD

The present disclosure relates to scheduling of electronic design automation (EDA) jobs in a cloud computing environment.

BACKGROUND

Electronic Design Automation (EDA) software applications are a category of software applications for designing electronic systems, such as integrated circuits and printed circuit boards. The applications work together in a design flow that chip designers use to design and analyze semiconductor chips. Since a modern semiconductor chip can have billions of components, EDA software applications are essential for their design.

For ease of use, software providers may provide EDA applications to be used in a cloud computing environment, utilizing a cluster of computing resources in the cloud. The EDA applications may be provided as a Software-as-a-Service (SaaS) offering, or as a Bring Your Own Cloud (BYOC) offering. In a BYOC approach, customers (users) of the provided software work directly with cloud providers, such as Microsoft Azure, Amazon Web Services, or Google Cloud. In this arrangement, the users maintain control over their cloud compute environment, and have unlimited access to the EDA software applications through a pay-per-use pricing model.

SUMMARY

One general aspect of the present disclosure includes a processor-implemented method for a graph explorer software tool. The method includes receiving at least one computing job from an electronic design automation (EDA) software application, and determining at least one precedence or successor job constraint for the received computing job. The method further comprises receiving information regarding job resource requirements, and generating a job packing schedule for the received computing job based at least in part, on the determined at least one precedence or successor job constraint and the received information. Subsequently, the method continues with transmitting the job packing schedule to at least one host computer of a computing cluster. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 depicts an exemplary flow of a method for practicing embodiments of the present disclosure.

FIG. 2 depicts another exemplary flow of a method for practicing embodiments of the present disclosure.

DETAILED DESCRIPTION

Figure 3:
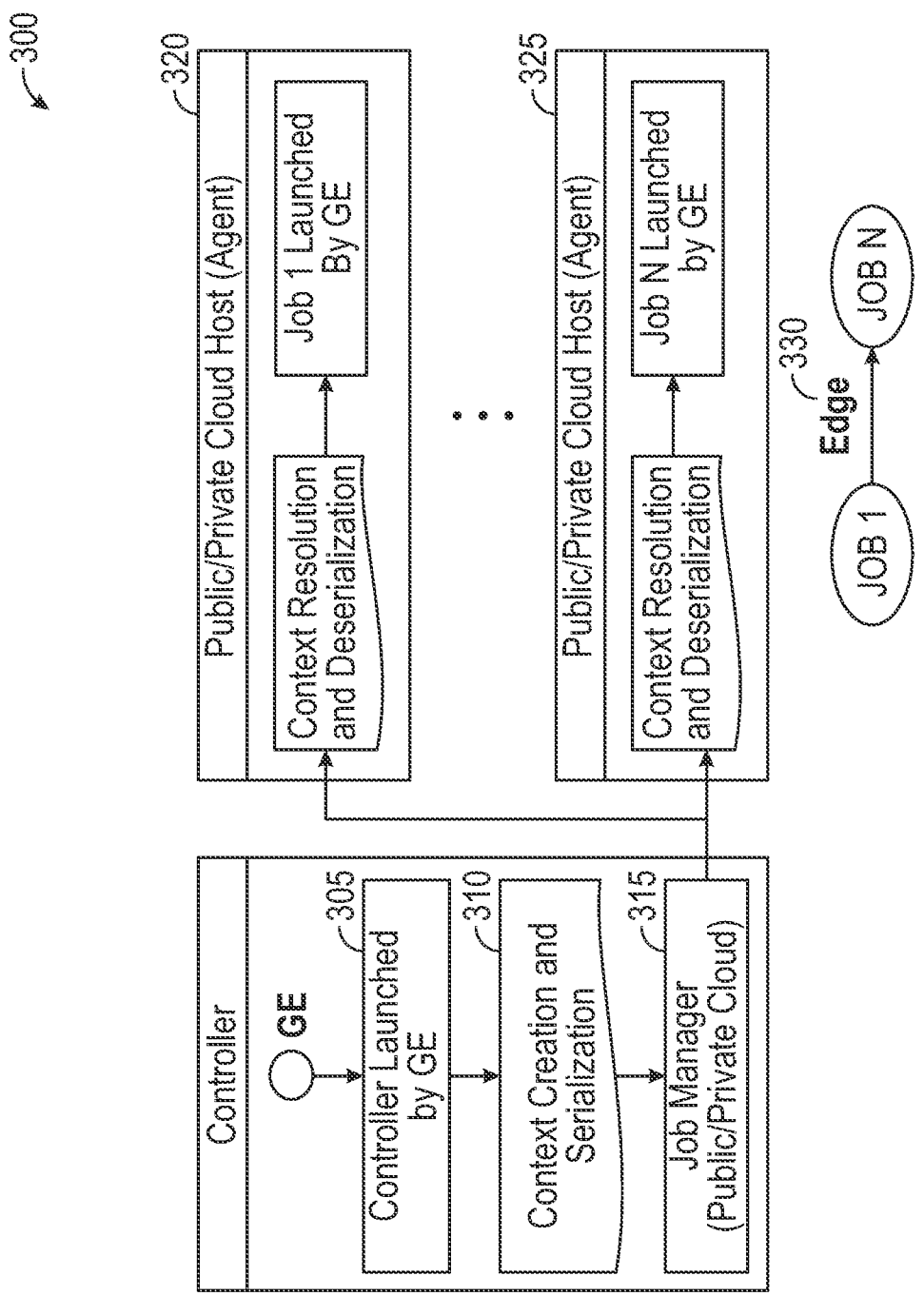
FIG. 3 depicts an exemplary workflow for context creation and sharing by the graph explorer.

Aspects of the present disclosure relate to dynamic job dependency discovery and constraints generation for scheduling EDA workloads in cloud computing environments.

In a SaaS approach to providing EDA software applications, a significant challenge for cloud computing environments, is for a computing cluster to accept, schedule, dispatch, and manage the remote and distributed execution of large numbers of standalone, parallel, or interactive user jobs. Typically, a grid engine is configured to perform these tasks over a static set of computing machines and perform job scheduling using a grid scheduler. Job scheduling in high-performance computing is a well-known problem where the set of tasks and their inter-dependencies are known in advance. Many different frameworks and tools define programming models that allow a user to write a domain specific language (DSL) to define the tasks. However, for certain EDA software applications, the inter-dependency of specific computing tasks may change over time, and may trigger dynamic jobs that are not pre-defined in DSLs. Thus, the set of tasks and inter-dependencies between them, which define a job graph, cannot be fully known in advance, and a user cannot write a domain specific language to define all of the tasks in advance. Because of this dynamic nature of the computing jobs generated by an EDA software application, a dynamic job graph is generated for computing tasks of the EDA software application. Managing these dynamic job graphs that are executed as part of a regression test suite of design under test (DUT) adds an additional level of complexity. In addition, the execution profiles of the jobs change over time, and it is crucial to know different parameters of resource requirements of each job to be able to schedule them effectively. Thus, there is a need to dynamically discover job dependency and changes to job dependencies over time by monitoring jobs running in a public or private cloud. To do this, it is necessary to record and set the execution context of jobs spawned in different containers or hosts in a cloud environment without access to shared memory. It is further necessary to discover job dependencies in containers and infer jobs that are dependent upon each other. That is, a prior job that is required to be performed before an instant job can be executed is a precedence constraint to the instant job, while a successor job that is required to be performed after an instant job is executed is a successor constraint to the instant job. There is additionally a need to characterize a workload generated by jobs in terms of job dependencies. To do this, it is necessary to characterize and store resource usage metrics of jobs in terms of CPU, memory, and I/O over the period of its execution. Finally, there is a need to discover a global job graph by identifying inter-job predecessor/successor dependency constraints in a global context.

When computing jobs are scheduled onto a computing cluster, it is typically unknown if any of the computing jobs rely on output from a previous computing job in order to execute properly. Thus, it us unknown if there are any dependencies between the scheduled jobs for the cluster. If the dependencies are not understood, it can result in peak loads of cluster resources followed by long bouts of idle time. To optimize the resource usage and throughput of the cluster, when multiple jobs are run on them, there is a goal to schedule jobs effectively. This effective scheduling of jobs yields a maximization of resource utilization to increase performance of the cluster, as well as to ensure fairness in equal distribution of workloads among the available computing resources. The primary aim of the scheduler is to pack jobs efficiently, such that the computing jobs are equally distributed among the available computing resources, and can be executed in an order that takes into account any precedence or successor constraints, in a timely manner. The scheduling problem can be represented as a hierarchy of inter-dependent jobs. The top of the pyramid represents the problem of scheduling regressions (such as from an EDA software application), and middle levels illustrate the problem of scheduling test-cases and job dependencies. If the computing jobs are scheduled using a typical grid scheduler, where the jobs are typically all known in advance, there can be an under-allocation of computing resources at the top of the pyramid.

At the middle level of the pyramid, it becomes evident that the source of the under-allocation of computing resources by a typical grid scheduler is the lack of understanding of the dependency between jobs, and ignoring the global view of the overall cluster usage by jobs. If resource allocation is sub-optimal, job scheduling tends to be overly pessimistic by not making use of all available resources. The pessimism arises because there are dependencies amongst the jobs that are not known or understood by the typical grid scheduler. Further, not all computing jobs require CPU resources (some require only I/O resources from the cluster), and thus these jobs can be packed for simultaneous execution by the cluster, if these constraints are properly studied and designed.

Often the higher-level jobs (such as read drivers that trigger regressions) are scheduled manually. The higher-level jobs trigger a significant number of lower-level jobs onto the cluster of resources. The lower-level jobs in turn can again trigger other jobs onto the same cluster. Thus, the problem of scheduling can be defined as scheduling a hierarchy of jobs. The higher-level jobs are implicitly dependent on completion of lower level jobs. Further, there are dependencies amongst the jobs at the same level of hierarchy that are to be discovered. In addition, for some EDA software applications, complex dependency graphs are possibly present, between the higher level jobs and lower level jobs.

The present disclosure describes an innovative way to record evolving job graphs in an in-memory data-store for complex EDA software applications. In some example embodiments, the EDA software application has a master controller (e.g., an orchestrator process) that invokes a series of inter-dependent jobs in different hosts of a cloud computing cluster to run the emulation flow. The orchestrator understands the dependencies among the jobs it initiates but the dependencies are unknown to the scheduler that schedules the jobs onto the various hosts of the cloud computing cluster. These jobs are self-contained from the perspective of the scheduler, since the scheduler has no information about predecessor jobs or successor jobs. Each job is invoked by the orchestrator based on the control flow described by the users of the EDA software application that represents a phase in the emulation design cycle. The invocation of these jobs forms a Directed Acyclic Graph (DAG) that defines the relation between the jobs. In the context of hierarchy, these orchestrator jobs are run for each test for the EDA software application.

Aspects of the present disclosure specify dependencies of child jobs H(j) under the umbrella of a Top-Level job (T(i)). That is, H(j) jobs that are immediately triggered by a T(i) job are specified. In the context of an EDA software application, that translates to how to execute test jobs (each running a conductor) to specify dependencies between jobs.

Aspects of the present disclosure further discover and record dependencies of jobs triggered by a Conductor process C(j), under the umbrella of higher-level test jobs H(j). C(j) are invoked per test job H(j). Each job triggered by C(j) is an EDA software application run job E(k) that is run as part of an emulation cycle. E(k) jobs, when run as part of a flow, can create bit streams that run on different configurations of target specialized hardware. The E(k) jobs are also run on the same cloud computing cluster, in various embodiments.

Aspects of the present disclosure further provide methods for scheduling many different regressions T(i)'s as the hardware pool is costly and limited. The pool must be shared by developers that run tests in an on-demand fashion. Typically, regressions are conducted on the hardware pool according to a pre-defined schedule. There are high priority requests that come in asynchronously that affects the schedule of regressions, as all of them are bound by the release schedule. The present disclosure also describes a method to create a schedule that can run multiple Top-Level jobs T(j) that are independent but can be studied with the same methodology by providing user defined constraints.

Aspects of the present disclosure further provide an edge inference method to solve the dependency problem. Aspects of the present disclosure further provide methods to collect samples for each job to create solutions to the scheduling problem. In one embodiment, bounding boxes are created by applying time series methods to these samples. Subsequently, near-optimal packing of these bounding boxes onto the resource bins can be achieved.

Embodiments of the present disclosure provide for analysis and optimization of performance of a computing cluster at multiple levels of abstraction, e.g., at test suite (T(i)) level, at test driver (H(j)) level, and at job level. Jobs at each level form a hierarchy such that higher level jobs are umbrella jobs that can be described as an aggregate of some or all of the lower-level jobs. With this hierarchical abstraction, computational resources can be optimized based on different patterns of usage. For example, a developer is seldom looking across H(j) job dependencies to optimize resources. However, from an operations perspective, it can help to gather deep insights on cost, energy and other parameters that can be optimized. A developer view of the system is about vertical scaling—how to optimize individual emulation jobs to optimize a single run and thereby hope to improve overall performance of a system. An operations view is about horizontal scaling—how to maximize throughput of a computing cluster and reduce cost and energy footprint. The present disclosure addresses the operation aspect of the problem. The same methodology can however be executed at an individual job level to optimize their run-time. One way to accomplish this is by using Perf events from a Kernel operating system.

The present disclosure provides for a creation of a hierarchy of jobs (via a job graph), that are triggered in a cloud computing cluster. The hierarchy of jobs is created by use of context setup and transmission. The present disclosure also provides for the creation of a Directed Acyclic Graph (DAG) of jobs that have complex dependency but are triggered in the cluster by a central orchestrator process of the EDA software application in lock-step. Further, the present disclosure provides that the job graph and DAG are analyzed, and edges merged, to create constraints for the entire set of processes that utilize the cluster pool. In addition, an execution profile is created of each job as a time series of CPU, memory, and I/O usage. The time series analysis techniques are used to create approximate bounding boxes of resource demands that are then used in subsequent scheduling algorithms.

As used herein, a "job" is any process coming from an EDA software application run. A "Graph Explorer", or GE, is an executable that is used to run every job to determine job dependencies. When a job is invoked with Graph Explorer, it first records the context of execution of the job to determine a relation between the invoker process and the host process.

A "context" of job execution is defined by any one or more of a host, kernel, or process group in which a job exists. In cloud terminology, it is an execution unit that needs to be monitored, for example, a container executing a set of processes. A "constraint" for a job is the set of conditions between jobs where a job absolutely needs to satisfy these conditions to be able to execute. An example constraint is a total resource usage on a host must never exceed the host's total capacity. In another example, a constraint defined by a regression system may be that a particular test needs to be executed before another test.

A "cluster membership service" is infrastructure to determine different states of a job execution during its lifecycle. An "execution context" is the configurations related to the job execution setup. This information is acquired using operation system (OS) level services and other third-party applications (e.g., in-memory store). A "leader" in distributed systems is a special process (or host, thread, object) with the ability to assign work, monitor and communicate state of all members. It also has ability to modify a piece of data or even the responsibility of handling all requests in the system.

As used herein, the Graph Explorer is a host job that launches real jobs in the specified cluster. Graph Explorer performs two primary operations: When invoked, it looks for a context of the job, where the context is one or more of a host, kernel, or process group in which a job exists. If the job has no context, Graph Explorer will setup the context. Moreover, if Graph Explorer successfully determines the context, the system assumes that the GE instance that sets up the context has sent a message to the current GE instance. The GE instance implements interfaces to Linux kernel process invocation methods as well as with grid manager(s) for the cloud computing cluster(s) that help invoke a remote process. GE can employ tracing logic to trace the context through the jobs to determine edges of a hierarchical Job Graph mapping the levels of dependent jobs that are invoked by an instant computing job.

Technical advantages of the present disclosure include, but are not limited to, providing a system that discovers unknown dynamic dependencies between compute jobs and job dependencies within a set of top-level EDA jobs, and lower-level compute jobs that may be spawned by a top-level EDA job. Further, the disclosed system characterizes job resource requirements, arrival/exit times, and dependency constraints between jobs in networks of dependent jobs of arbitrary complexity. These job characteristics are essential to improve total execution time and higher utilization of resource pool using scheduling algorithms. As a result, the utilization of the hardware resources a pool of computing resources may be improved.

The present disclosure also provides a novel method for determining dependency between lower-level jobs. In particular, a central orchestrator tool provides direct insights into the jobs that it forks. Job execution contexts for all jobs are stored in a global shared memory data-structure. Local files for job environment setup are serialized by message passing through the orchestrator. Dependencies are inferred from the implicit spawning order of jobs from other jobs. In addition, historical data analysis is used to generate statistical bounding boxes for job resource requirements.

The system further provides an advantage of generating a globally valid dynamic pack that provides statistical bounds on user metrics of total time, utilization, etc. for the computational resources. This allows close-to-optimal scheduling space for dynamic jobs.

FIG. 1 depicts an exemplary flow of a method 100 for practicing embodiments of the present disclosure. In exemplary embodiments, method 100 is performed by a central orchestration software tool (also referred to herein as a conductor) of an Electronic Design Automation (EDA) emulation software. The method 100 begins at block 105 with the launch of a computing job from a software application. In various embodiments, the computing job is from a software application used in the Electronic Design Automation (EDA) process for designing a computing chip, or integrated circuit. In particular, the computing job may be for a regression tool used in an EDA software suite, for a particular Design Under Test (DUT). The computing job launched at block 105 can be launched by a human user, or by a computing process.

At block 110 of method 100, the orchestrator calls a Directed Acyclic Graph (DAG) of jobs. The DAG may be generated at this step, or a previously generated DAG may be called or updated at this step.

The present disclosure provides for a unique, executable called a Graph Explorer that executes every relevant process or computing job in a sample set of jobs for which the dependencies amongst them need to be determined. When a job is invoked with the Graph Explorer, the Graph Explorer first looks for the context of execution of the job at a pre-configured channel in an in-memory store. Using in-memory store and execution context, the Graph Explorer determines the relationship between current job and the job that invoked the current job (parent).

The first job invoked by the Graph Explorer sets up the context of all the jobs that are invoked hierarchically in the entire cluster. For example, if a top-level regression driver of an EDA regression software application is invoked by Graph Explorer, the driver becomes the root of a DAG that is generated for that computing job. When the driver further invokes individual test drivers using Graph Explorer, edges of the DAG are discovered by an edge inference algorithm discussed below that creates edge between top-level regression driver process and the test-driver A similar methodology can be used for processes invoked by orchestrator process to initiate jobs that are dependent on others. That is, an edge inference algorithm can be used to discover the dependencies between the computing jobs and used to build edges of DAG representing relevant (invoked by Graph Explorer) emulation compute jobs. In addition, dependencies between test jobs can also be discovered using Graph Explorer.

When the EDA orchestrator uses Graph Explorer to initiate all of the computing jobs, the dependencies between the jobs can be discovered with 80-100% accuracy using Graph Explorer execution modes, as will be discussed further below. In this way, method 100 can be readily used by any system that provides a way to override default job invocation to use a Graph Explorer to invoke computing jobs for a software application.

In one method of discovering dependencies between computing jobs, the orchestrator that is run as part of EDA software application, creates a job context by transmitting the execution context of itself onto the possibly dependent jobs that are triggered at various stages by the orchestrator. As used herein, the execution context can be any one or more of a host, kernel, or process group in which a job exists. Any job invoked by Graph Explorer, if provided with the job context, becomes a probable child of the job that invokes it. If no previous job invokes the present job, then the present job becomes an independent "unconnected" node of the DAG, and can be scheduled together with any other jobs invoked by orchestrator. A child (dependent) job's context can be obtained from its parent job by way of key lookup from an in-memory store. If no context can be obtained for a child job, then it becomes an independent node of the DAG.

In this way, at block 110, the orchestrator can dynamically discover job dependency and changes to job dependencies over time by monitoring jobs running in a public or private cloud. Further, the orchestrator can record and set the execution context of jobs spawned in different containers or hosts in a cloud environment. Further, the orchestrator discovers job dependencies in containers and can infer precedence/successor job constraints for a particular job launched by an EDA software application.

Once the job and context are setup at block 110 of method 100, then the orchestrator profiles the launched job using an in-memory database, at block 115 of method 100. In example embodiments, the profiling is accomplished by collecting samples of previously executed jobs and committing the job information to a high-performance (low latency) in-memory data store, which may be a database. While committing to the data store, the orchestrator can read the job contexts and infer a graph "edge". The various graph edges are then connected to form an evolving dynamic process graph (DAG).

In this way, an overall workload generated by jobs and their respective dependencies can be characterized by a Graph Explorer and orchestrator. Further, in this way, the orchestrator can characterize and store resource usage metrics of jobs in terms of CPU usage, memory usage, and I/O usage over the period of a job's execution, including all of its dependent jobs. Information associated with the job, such as the workload, dependencies, resource usage metrics, etc., can be used to generate a profile for the job.

Once a profile is generated, an intermediate graph may be generated from the profiles, and stored in the in-memory data store. In some embodiments, every launched job is profiled at block 115. In other embodiments, only some launched jobs are profiled at block 115. That is, a job may be profiled the first time it is executed and/or at periodic time intervals. In subsequent instances of the launched jobs, the previously generated profile may be recalled at this step.

Once the intermediate graph is recorded in the in-memory data store at block 115, then the orchestrator identifies any precedence constraints among jobs invoked by the orchestrator using a cluster membership service, at block 120. The orchestrator traverses keys of the in-memory data store to resolve and organize dependencies between the different jobs to infer and refine constraints from the launched job from block 105. In various embodiments, an edge inference algorithm is used to accomplish this.

At block 125, the orchestrator characterizes the jobs, by creating I/O, memory, and CPU usage profiles using samples obtained from the jobs. The orchestrator selects and interpolates the samples that represent a bounding box of CPU utilization, memory utilization, and I/O utilization. These bounding boxes can then be used to schedule jobs. In one embodiment, polygon packing is used to find an optimal fitting of the polygons onto resource-bins. This fit is done along different vectors of I/O, memory, CPU usages.

In this way, at blocks 120 and 125, the orchestrator can discover a global job graph by identifying inter-job predecessor/successor dependency constraints in a global context. At block 130, the orchestrator can then instruct the launched jobs to execute on a computing grid.

Using method 100, EDA computing jobs can be scheduled for minimum overall job completion time and more predictable regression turnaround times (TAT). This is advantageous over prior systems, such as traditional grid schedulers, which prioritize fairness over performance to maximize a number of jobs run with equal distribution of resources at any time. In addition, with embodiments of the present disclosure, a regression computing task is scheduled as a variant of a bin packing problem, where the size of bins and balls may vary according to job resource requirements and differing server configurations on the grid. By using an adaptive binning approach, machine utilization is improved.

FIG. 2 depicts an exemplary flow of a method 200 for practicing embodiments of the present disclosure. The method 200 begins at block 205 with the launching of an EDA software application process using a custom job launcher Graph Explorer (GE). As discussed herein, the EDA software process is executed on one or more host computers that are part of a cluster in a public or private cloud computing cluster. In exemplary embodiments, GE records the execution context of the job invoked. The GE instances work with each other to discover the hierarchy of related jobs followed by execution of the jobs in the job dependency hierarchy that stems from the launching of the EDA process from block 205.

When the EDA job is invoked using GE, GE records at block 210 the execution context of that job to find a relationship between the present job and subsequent jobs that may be invoked from it (sub-jobs). This is recursively performed for jobs invoking other sub-jobs. In some embodiments, a Publisher-Subscriber mechanism using message passing can be used to transmit data about jobs (such as context, resources, etc.) between host computers.

After setup of a job and its context, GE collects job profile samples at block 215. Job profile samples may include information such as CPU usage, memory usage, and/or I/O usage for the particular job. The job profile samples may be collected and stored in a high-performance (low latency) in-memory database.

At block 220, time-series analysis is performed on the collected profile samples to generate bounding boxes for resource requirements. For example, a bounding box may have a minimum and/or maximum amount of CPU, memory, and/or I/O usage needed for each job profile. At block 225 of method 200, a Job Graph "edge" is inferred by GE from the context to form an evolving dynamic job graph. Each Job Graph edge represents a precedence constraint. The constraints are inferred and refined among the interdependent jobs. Further, the constraints are inferred and refined for each host in the cluster (e.g., availability of CPU, memory, I/O and user limits).

FIG. 3 depicts an exemplary workflow 300 for context creation and sharing by the graph explorer, such as that performed at block 215 of method 200 of FIG. 1. In workflow 300, a graph explorer software tool launches a controller of an EDA software application at block 305. In one example EDA software application, the EDA software has a master controller that invokes a series of inter-dependent jobs. Each job is invoked by the EDA software's master controller based on a control flow that is customizable by a user. These inter-dependent jobs together form a Directed Acyclic Graph. Scheduling of these multiple inter-dependent jobs on a computing cluster is complex, as some of the jobs of the set of inter-dependent jobs may be requested asynchronously, which in turn affects job scheduling.

With embodiments of the present disclosure, a graph explorer scheduler can pack these multiple inter-dependent jobs onto a computing cluster efficiently, even if received asynchronously, by feeding resource/job constraints, along with bounding boxes, to a constraint solver to derive a near optimal packing of jobs. At block 310 of workflow 300, the graph explorer creates a context and serialization profile for the set of inter-dependent jobs from the EDA software that is to be executed.

In some embodiments, execution context is borrowed by graph explorer from a top-level job that has triggered creation of the instant EDA software job. In other embodiments, graph explorer creates the context itself when a job is the first job launched by GE. The context of the current job is then serialized by graph explorer, using functionalities of a cluster manager. As used herein, a "context" may refer to requirements for the job to execute successfully, such as information regarding control parameters, variables, input information needed, etc. Context information for each particular type of EDA software job may be stored in a memory, and called by the job when needed to run the particular job.

As used herein, serialization is a process for converting the context information into text format that can be sent iteratively, packet by packet, over a network. In exemplary embodiments, the text may be in a structured text format.

At block 315, the EDA software job is assigned to a job manager of a public or private cloud computing cluster. In exemplary embodiments, the graph explorer transmits not only the context of particular EDA software job, but also all other required jobs that precede or succeed the EDA software job to determine job hierarchy, as discussed herein.

The job manager may then execute one or more of a job (from the set of inter-dependent jobs) to one or more public or private cloud host computers (agents). In some embodiments, the job manager transmits a specific job or sub-job to be completed, along with information for context resolution and deserialization to each host computer.

As used herein, deserialization is a process for converting the received text format back into an original format (before serialization). The serialization and deserialization process is important because various jobs can be executed by any node in the computing cluster, and the nodes may or may not have a shared memory. As such, job context information needs to be sent to each node with each job.

In the exemplary workflow 300 of FIG. 3, the job manager transmits sub-jobs of EDA software job to multiple agents. At block 320, graph explorer launches a first job (Job 1) of the EDA software job. At block 325, graph explorer launches another job (Job N) of the EDA software application, where N is any integer value. In various embodiments, any number of agents can be used to execute all or some of the jobs that are part of the EDA software job hierarchy.

In some embodiments, the job manager may transmit each of the sub-jobs to the respective agents substantially simultaneously. In other embodiments, the job manager may transmit each of the sub-jobs to the respective agents in a sequential manner. Graph explorer may further create or update a DAG for the job, such that an edge 330 is created between each of the sub-jobs (such as those in blocks 320 and 325). In this way, jobs 1 through N of the original EDA software job are noted as being related, and executed together each time EDA software job is run.

Figure 4:
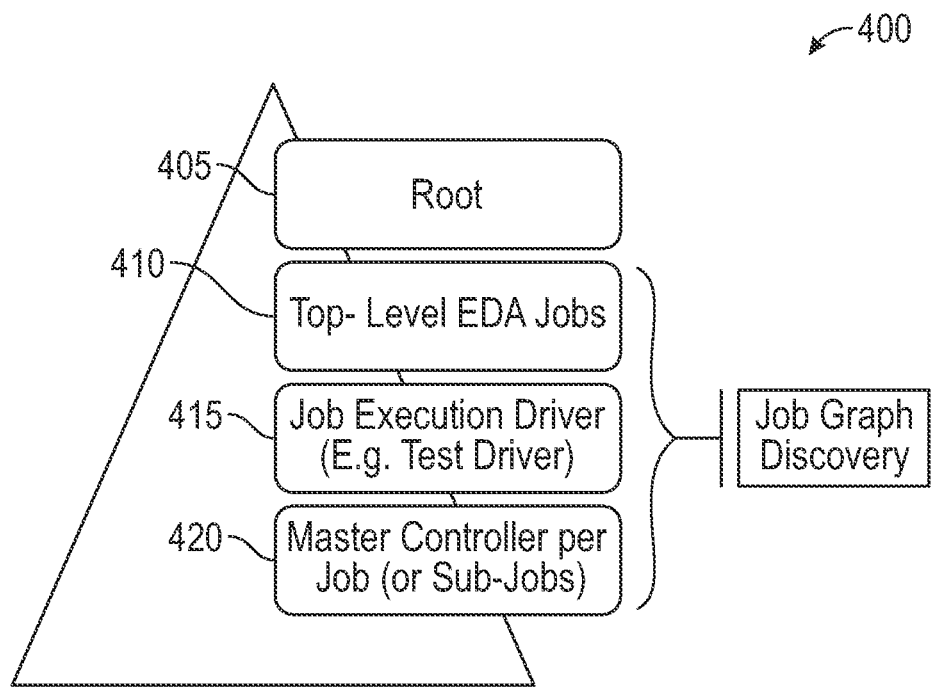
FIG. 4 depicts an exemplary graphic of a scheduling hierarchy created by embodiments of the present disclosure.

FIG. 4 depicts an exemplary graphic 400 of a scheduling hierarchy created by embodiments of the present disclosure. As discussed herein, scheduling of an EDA software job can be represented as a hierarchy of inter-dependent EDA jobs.

In one example, graph explorer is triggering and executing numerous unrelated jobs on one or more computing clusters. These numerous unrelated jobs are represented in block 405 of graphic 400, as part of a "root" node. Block 410 represents top level EDA jobs, which can trigger additional (sub) jobs using graph explorer. Graph explorer can define a complex set of directed acyclic graphs from these top level and sub-level EDA jobs, where the DAGs depict job parents and job children. Block 415 represents a job execution driver, which is executed for each of the sub-jobs. Further, block 420 of graphic 400 represents a master controller per job or sub-job.

In essence, the pyramid of graphic 400 depicts that each job can trigger another workflow or DAG. The tree of job creation can be represented as a scheduling hierarchy, where jobs can be scheduled at each sub-job level (at the bottom of the pyramid), or at a top level (at the top of the pyramid), which represents an aggregate characteristic of all the sub-jobs that have been triggered in the cluster.

For an example EDA software application, the two middle levels illustrate the problem of scheduling jobs related to test case execution and identifying job dependents. Using a traditional grid like scheduling system will result in a severe under-allocation of resources because of generalized scheduling based on fairness and true resource requirements of jobs are not considered while scheduling them.

As the pyramid in graphic 400 is traversed from downwards, there is an implicit precedence between jobs. Further, dependencies can be discovered between jobs at each level of the pyramid shown in graphic 400. According to embodiments of the present disclosure, dependency between the jobs are identified based on different job characteristics. That is, jobs can be either CPU, or memory, or I/O bound. Jobs can also be packed for simultaneous execution if resource constraints are properly studied and designed.

Figure 5:
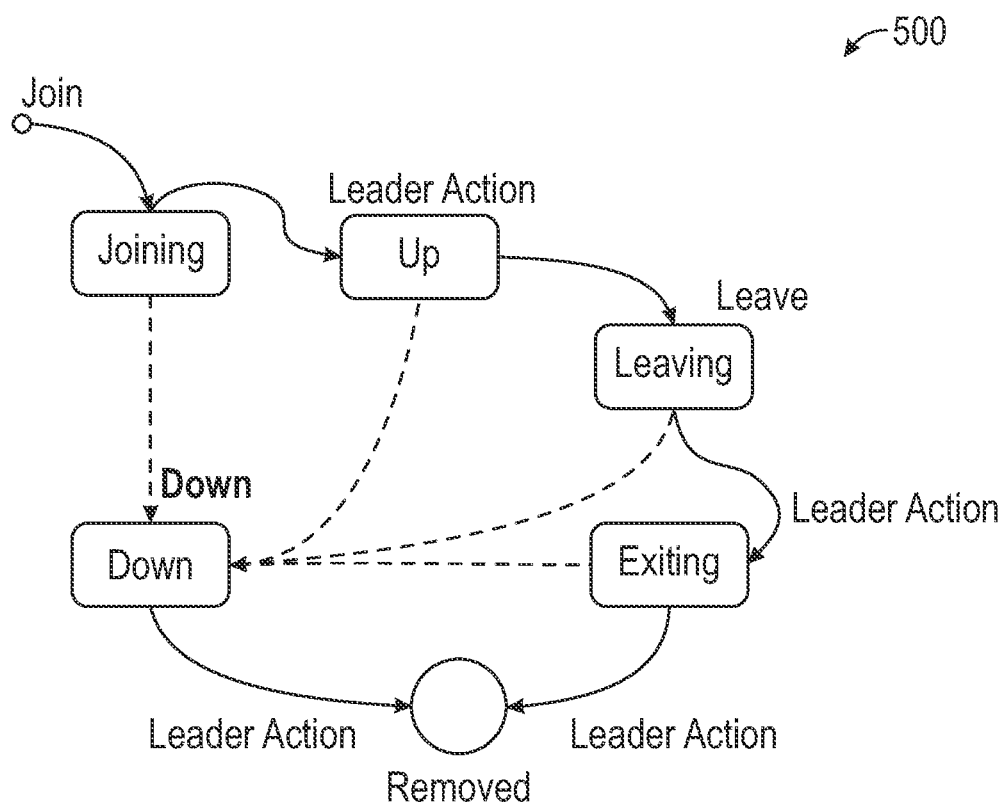
FIG. 5 depicts an exemplary lifecycle of cluster membership of a job.

FIG. 5 depicts an exemplary lifecycle 500 of cluster membership of a job. The lifecycle 500 can be used for inferring one or more edges of a DAG, by a graph explorer. When a central controller (conductor or orchestrator) is launched using graph explorer, it is invoked in a leader mode. Thus, graph explorer starts a cluster and becomes a leader.

When the central controller invokes a computing job using graph explorer in a child mode, the leader updates the job's state to 'joined'. When the job exits, the leader updates the state of the job as 'exited'. The leader can then construct a DAG based on the events generated by the cluster members.

As depicted in the lifecycle 500 of FIG. 5, when a job starts, GE sets the state as 'joining'. Once joined, the state of a job being executed is 'up'. When a job leaves, GE sets the state as 'leaving'. When a job exits the cluster, GE sets the state as 'exiting.' A job that joins the cluster but then fails to execute for some reason, may be in a 'down' state.

From lifecycle 500, GE creates an edge between all the jobs that are in an 'up' state to the ones that are in 'exiting' state. These edges are committed to the in-memory database. In some embodiments, jobs in a 'down' state are ignored. The edges can then be sorted topologically to infer the DAG. These edges signify the precedence constraints. That is, a job that begins after a first job exits, may be inferred to be dependent upon the first job.

Figure 6:
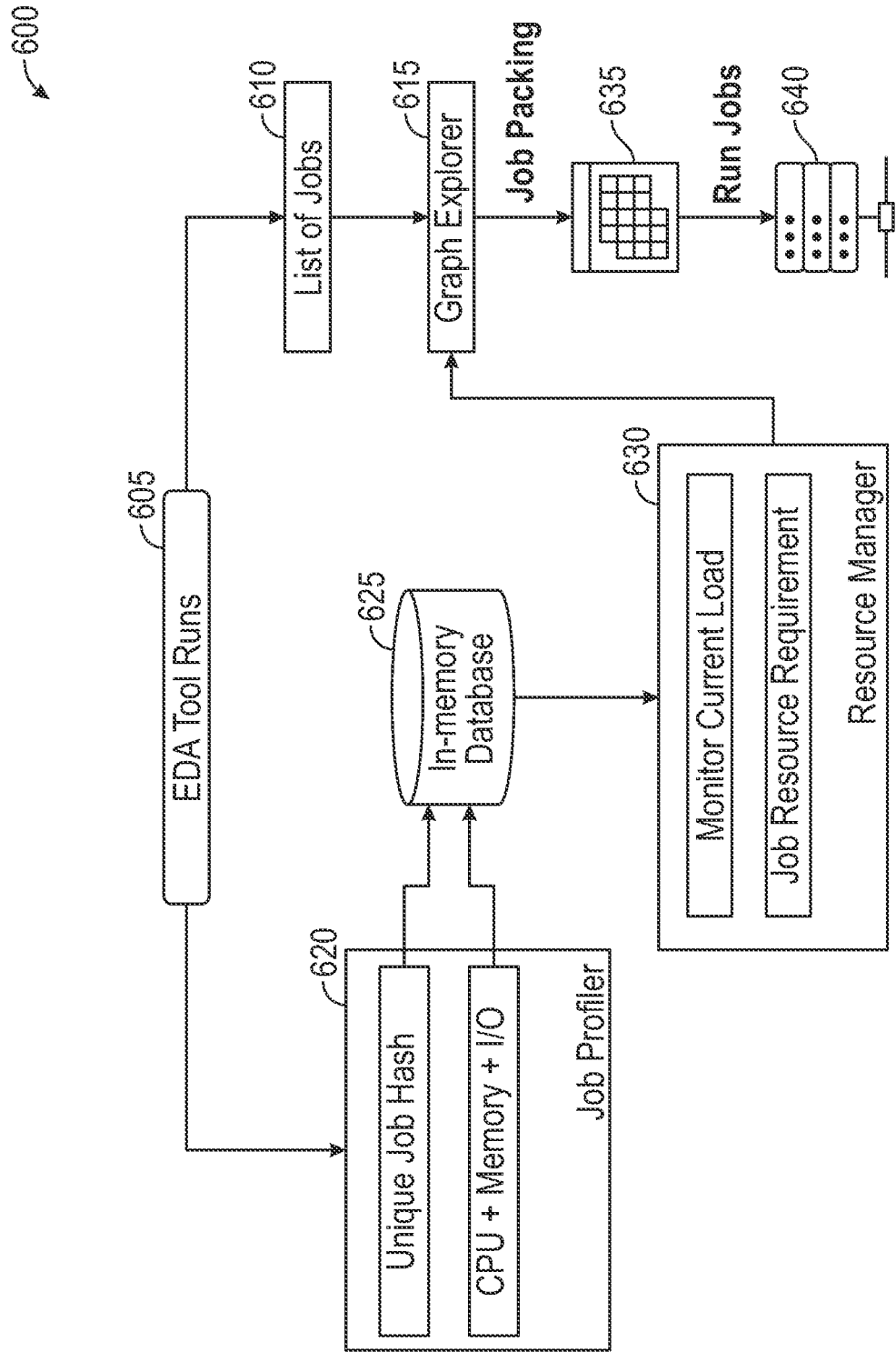
FIG. 6 depicts an exemplary workflow for job characterization.

FIG. 6 depicts an exemplary workflow 600 for job characterization. In various embodiments, exemplary workflow 600 is performed by a central orchestrator. At block 605 of exemplary workflow 600, an EDA software application is operated. The EDA software application then generates one or more computing jobs that are to be executed, as part of the EDA software operations. While EDA software computing jobs are discussed herein, embodiments of the present disclosure are also applicable to computing jobs generated from other types of software other than EDA software applications.

At block 610, a list of jobs generated from the EDA application run is prepared, and then sent to the graph explorer at block 615. Each EDA application job is sent to a job profiler at block 620. The job profiler generates a unique job hash from the EDA software application job, and uses the unique job hash to consult an in-memory database at block 625 and check if the job has been seen before. If so, in-memory database may have information regarding at least one of computing resource requirements to execute the job (CPU, memory, and/or I/O usage needed), and/or related jobs, such as child or parent dependencies from the current EDA job.

The job and any related information gleaned from the in-memory database at block 625 is then sent by the orchestrator to a resource manager at block 630. The resource manager monitors a current load of one or more hosts in one or more computing clusters. The resource manager also generates a job resource requirement, which is a requirement for an amount of computing resource needed to execute the job. As used herein, computing resource requirement may be one or more of CPU usage, processing time, memory usage, and/or I/O usage.

Information from the resource manager is sent to the job packing module via Graph Explorer. Graph Explorer collects process samples (from the samples collected from in-memory database), as well as discovers job dependencies. In exemplary embodiments, a process sample may consist of one or more of CPU requirements, memory requirements, and I/O requirements.

Utilizing the job information from the resource manager, Graph Explorer invokes the specific computing job(s) and any related jobs needed through a job packing operation at block 635. In various embodiments, job packing comprises scheduling the computing jobs to be executed on one or more host computers in an appropriate order based on any job dependencies, job resource requirements, and/or a current load on the one or more host computers. The job packing is accomplished using the statistical profile and constraints obtained using dependency discovery by the graph explorer. In various embodiments, job packing further comprises scheduling computing jobs on identified target host profiles. From there, the job(s) are run on the one or more host computers at block 640.

The orchestrator can further monitor all the processes invoked by graph explorer using Control Groups (cgroups). Further, the orchestrator can store all relevant job data in a high-performance in-memory store. While the term "database" is used at block 625, the data may be stored in other types of data structures in other embodiments. Further, in some embodiments, at a pre-defined time step, the orchestrator may interrupt workflow 600 to generate a job sample and upload it to the in-memory store. Once all the samples are obtained, the orchestrator can create a statistical profile of a job's resource usage, which may also be stored at the in-memory store at block 625 and called by the job profiler at block 620. This statistical profile is used by graph explorer to conduct the job packing operation at block 635.

Figure 7:
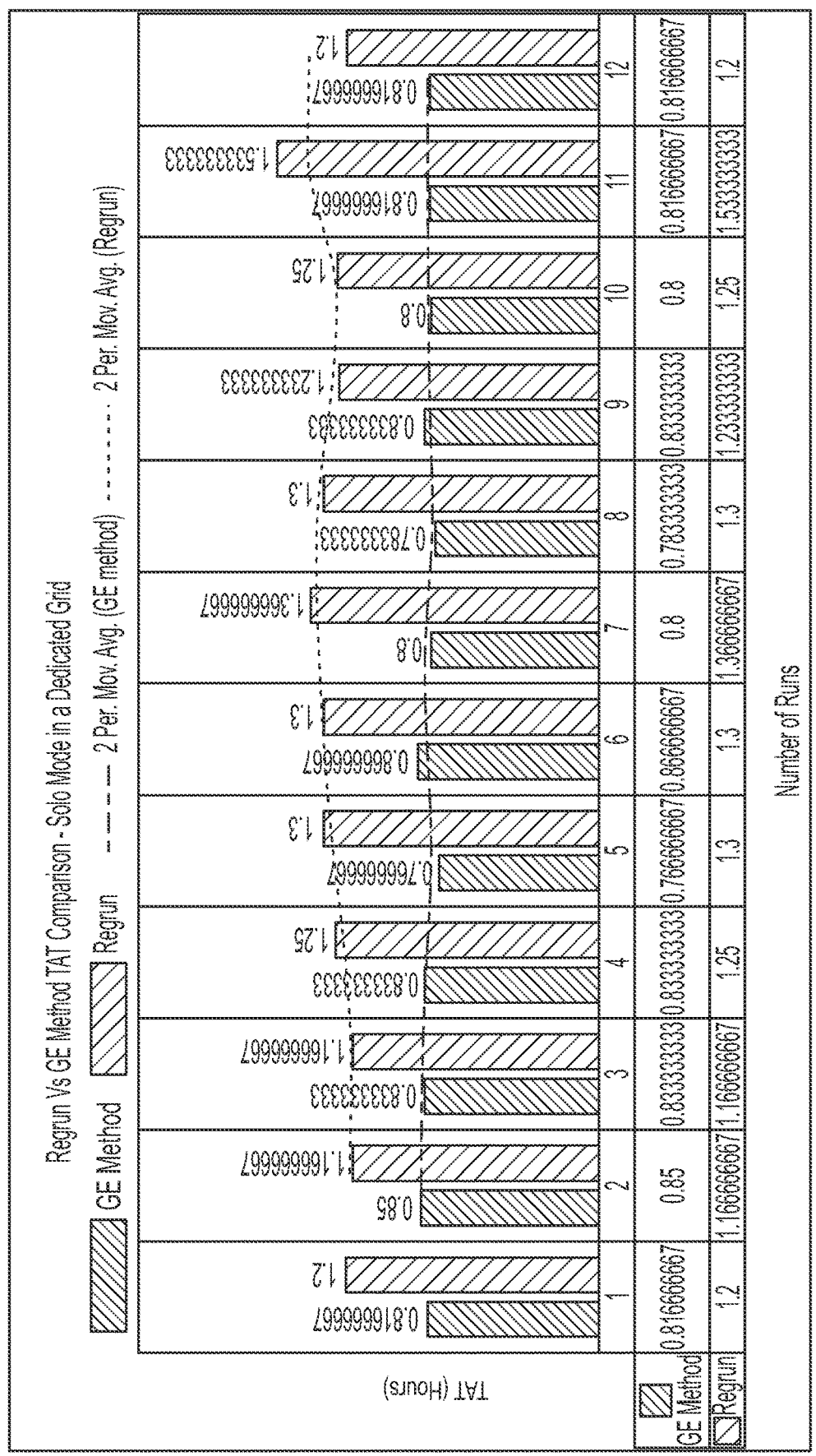
FIG. 7 depicts a chart with experimental results, comparing a previous process with an embodiment of the present disclosure.

FIG. 7 depicts a chart 700 with experimental results, comparing a previous process (noted at Regrun), with an embodiment of the present disclosure (noted as GE method). A set of controlled experiments was conducted using 10 homogeneous physical hosts with a combined 300 CPU slots, 2.5 TB memory, and 20 TB of disk storage. The 10 hosts were setup as a private UGE grid project in a controlled setting. Job packing and execution were conducted using the Graph Explorer method described herein, as well as using a previous process, for a sample set of 500 test cases from an EDA software application. Using embodiments of the present disclosure, the GE method reduced a median turn-around time (TAT) from 1.25 hours to 0.82 hours, thus providing faster processing of EDA software jobs. Further, there was a reduction in TAT variance, from 0.011 to 0.001, thus providing higher, more stable and predictable resource utilization.

Figure 8:
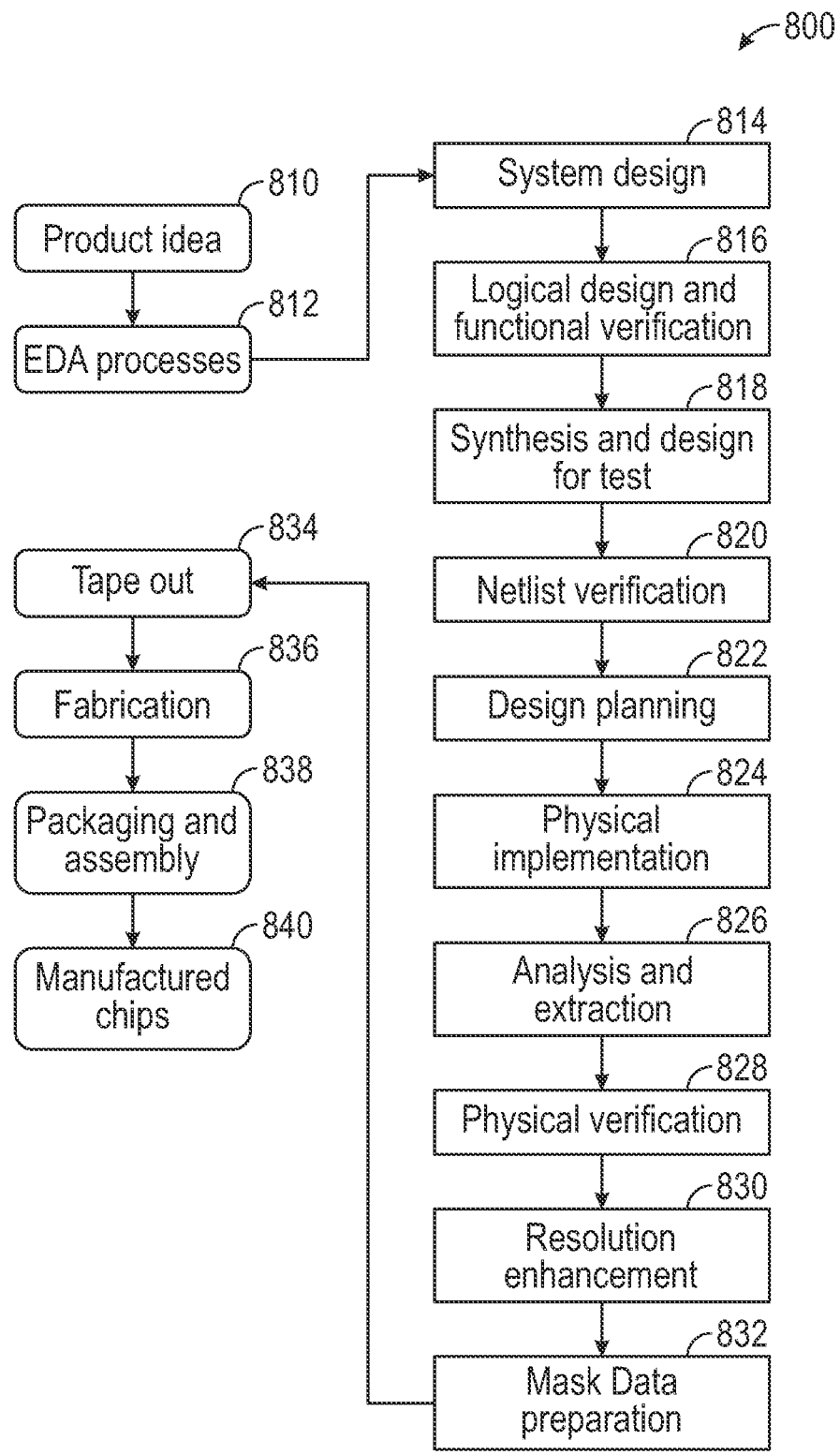
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 332 (RS232)

or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs 804$_1$ and 804$_2$ as well as additional FPGAs to 804N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 804$_1$-804$_N$ may be placed onto one or more boards 812$_1$ and 812$_2$ as well as additional boards through 812$_M$. Multiple boards can be placed into an emulation unit 814$_1$. The boards within an emulation unit can be connected using the backplane of the emulation unit or any other types of connections. In addition, multiple emulation units (e.g., 814$_1$ and 814$_2$ through 814$_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
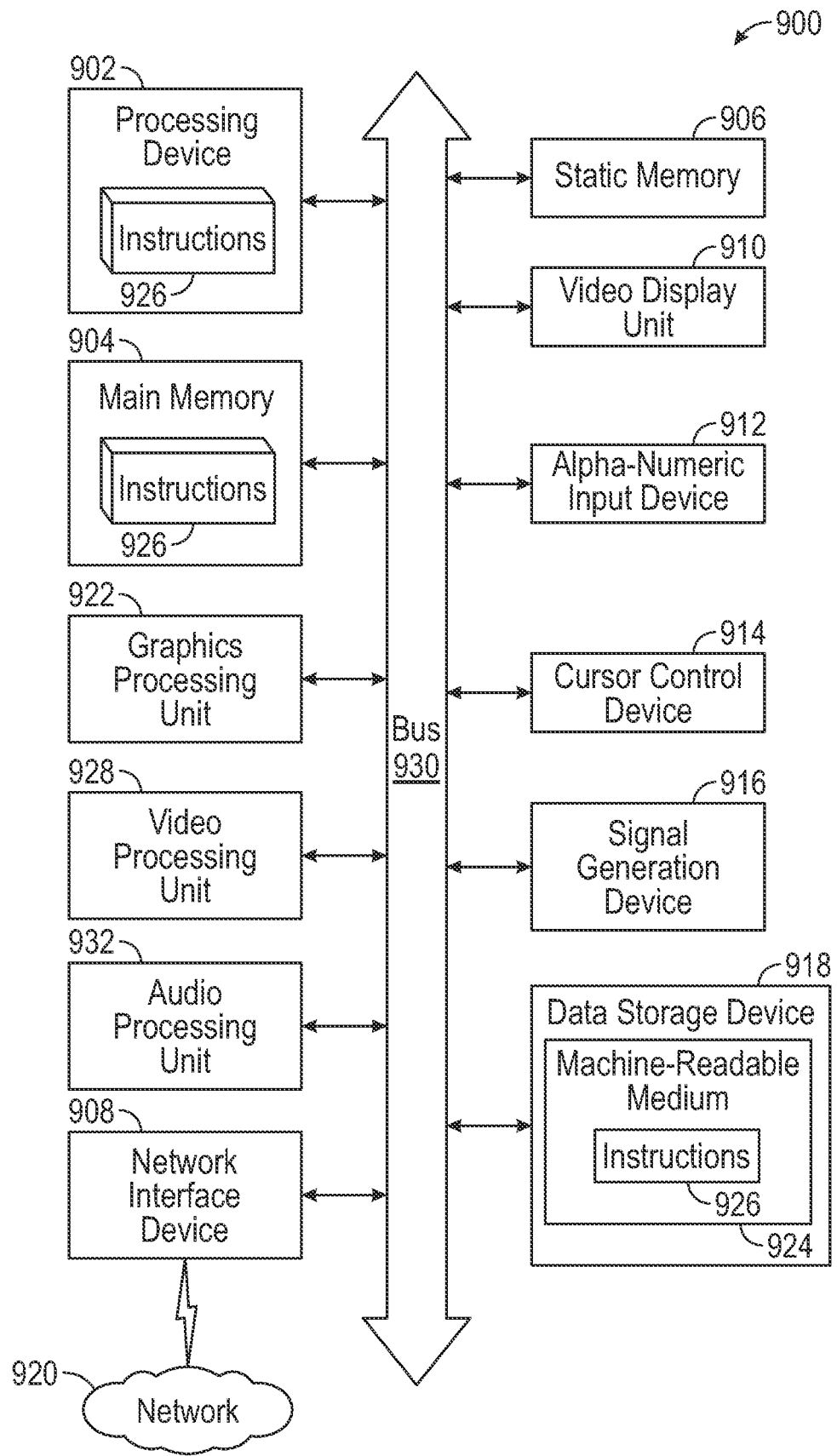
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920.

The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a first computing job from an Electronic Design Automation (EDA) software application;
   determining a precedence or successor job constraint for the first computing job received from the EDA software application based on a first profile for the first computing job and a second profile for a second computing job, wherein the first profile and the second profile are determined based on job contexts determined from samples of executed jobs, the first profile is a statistical profile of resource usage of the first computing job and the second profile is a statistical profile of resource usage of the second computing job, and determining that the second computing job is triggered by the first computing job by determining a dependency between the first profile and the second computing job based on the first profile and the second profile;
   receiving information regarding job resource requirements associated with the first computing job;
   generating, by a processing device, a job packing schedule for the first computing job based at least in part on the determined precedence or successor job constraint and the received information, wherein the precedence or successor job constraint is determined before the job packing schedule is generated; and
   transmitting the job packing schedule to at least one host computer of a computing cluster.

2. The method of claim 1, further comprising:
   receiving information regarding a current load of at least one host computer in the computing cluster.

3. The method of claim 1, wherein the determining the precedence or successor job constraint for the first computing job is based at least in part on information received from a cluster membership service.

4. The method of claim 1, further comprising: generating a Directed Acyclic Graph (DAG) depicting the determined precedence or successor job constraint, and the first computing job.

5. The method of claim 4, wherein the generating the DAG is based at least in part on an edge inference algorithm.

6. The method of claim 4, wherein the generating the job packing schedule is further based on the generated DAG.

7. The method of claim 1, wherein the computing cluster is a public cloud computing network.

8. The method of claim 1, wherein the computing cluster is a private cloud computing network.

9. The method of claim 1, further comprising determining an execution context for the first computing job.

10. A processor-implemented method comprising:
    receiving at least one computing job from an Electronic Design Automation (EDA) software application;
    recording an execution context for the received at least one computing job;
    collecting a plurality of job profile samples;
    performing a time-series analysis of the collected plurality of job profile samples to determine a statistical profile of a job resource usage for the at least one computing job;
    inferring at least one edge of a Directed Acyclic Graph (DAG) by providing the recorded execution context to a second computing job and determining that the second computing job is triggered by the first computing job based on the execution context and the statistical profile, wherein the at least one edge of the DAG represents a precedence constraint, and the at least one edge is refined based on an interdependent computing job;
    generating the DAG for the received at least one computing job; and
    taking one or more actions based on the generated DAG.

11. The method of claim 10, wherein the taking one or more actions based on the generated DAG comprises storing the generated DAG in a memory.

12. The method of claim 10, wherein the taking one or more actions based on the generated DAG comprises displaying the generated DAG on a display.

13. A system comprising:
    a memory storing instructions; and
    a processor, coupled with the memory and to execute the instructions, the instructions when executed cause the processor to:
      receive a first computing job from an Electronic Design Automation (EDA) software application;
      determine at least one precedence or successor job constraint for the first computing job based on a first profile for the first computing job and a second profile for a second computing job, wherein the first profile and the second profile are determined based on job contexts determined from samples of executed jobs, the first profile is a statistical profile of resource usage of the first computing job and the second profile is a statistical profile of resource usage of the second computing job, and determining that the second computing job is triggered by the first computing job by determining a dependency between the first computing job and the second computing job based on the first profile and the second profile;

receive information regarding job resource requirements associated with the first computing job;

generate a job packing schedule for the first computing job based at least in part on the determined at least one precedence or successor job constraint and the received information; and transmit the job packing schedule to at least one host computer of a computing cluster.

14. The system of claim 13, wherein the instructions when executed further cause the processor to:

receive information regarding a current load of at least one host computer in the computing cluster.

15. The system of claim 14, wherein the determining the precedence or successor job constraint for the first computing job is based at least in part on information received from a cluster membership service.

16. The system of claim 13, wherein the instructions when executed further cause the processor to: generate a Directed Acyclic Graph (DAG) depicting the determined at least one precedence or successor job constraint, and the first computing job from the EDA software application.

17. The system of claim 16, wherein the generating the DAG is based at least in part on an edge inference algorithm.

18. The system of claim 16, wherein the generating the job packing schedule is further based on the generated DAG.

19. The system of claim 13, wherein the computing cluster is a public cloud computing network.

20. The system of claim 13, wherein the instructions when executed further cause the processor to: determine an execution context for the first computing job.

* * * * *